April 7, 1964 J. J. HULKA 3,127,986
KIT MEANS
Filed April 30, 1962
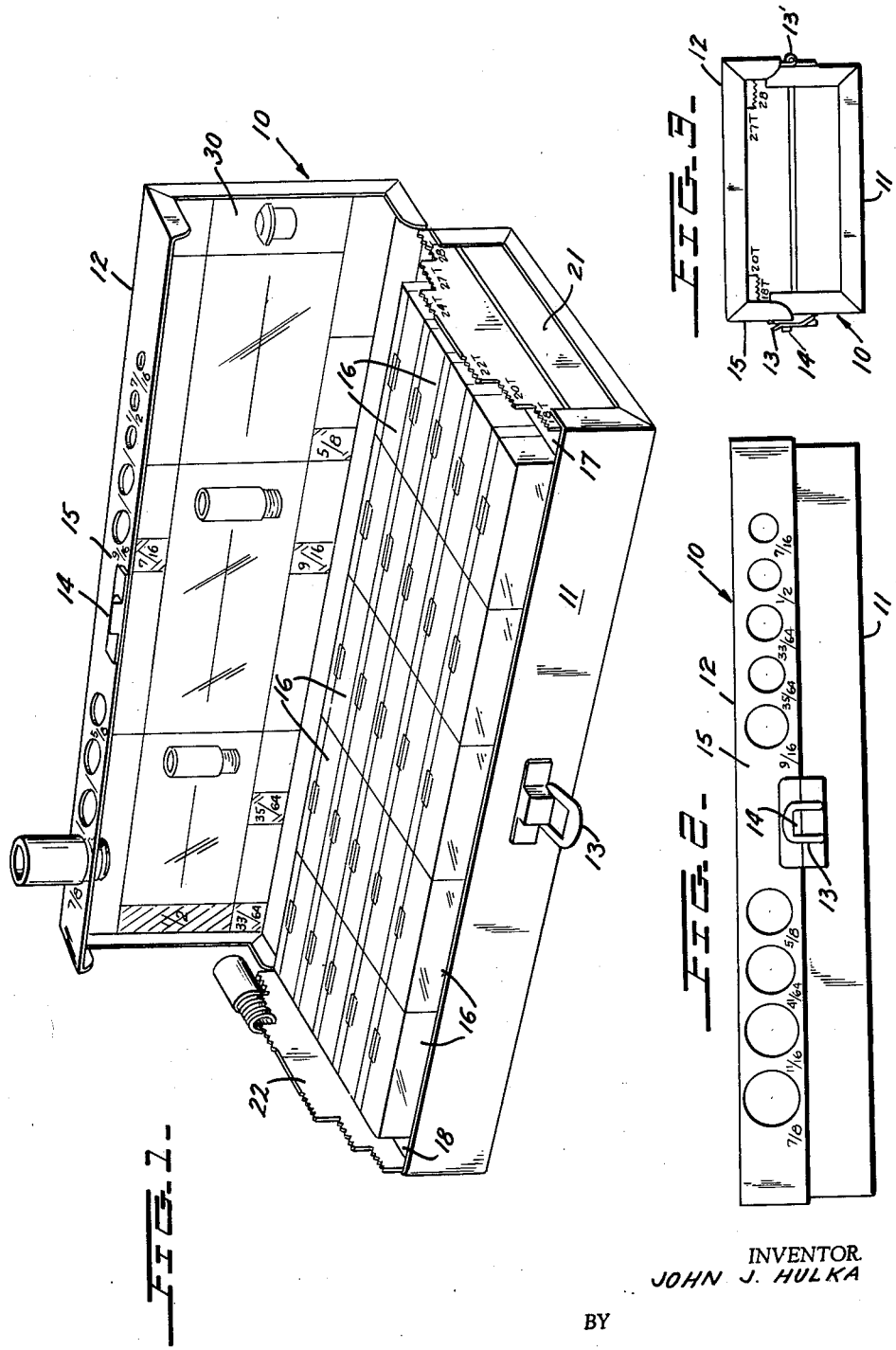
INVENTOR.
JOHN J. HULKA
BY
OSTROLENK, FABER, GERB & SOFFEN
ATTORNEYS United States Patent Office 3,127,986
Patented Apr. 7, 1964

3,127,986
KIT MEANS
John J. Hulka, Massapequa, N.Y., assignor to Crest Manufacturing Company, Incorporated, Syosset, N.Y., a corporation of New York
Filed Apr. 30, 1962, Ser. No. 191,035
5 Claims. (Cl. 206—16)

The instant invention relates to a novel kit means for replacement parts and, more particularly, to a kit means having provisions for readily determining the identity of a required replacement part and means for readily securing the proper replacement part once its identity is determined.

Many craftsmen, and plumbers in particular, are often called upon to replace small size fittings. Certain dimensions of the replacement fitting must be identical to certain dimensions of the fitting to be replaced. For example, the thread size and diameter of replacement valve seats must be identical to the thread size and diameter of the valve seat being replaced. Since there are many different valve seat manufacturers, each making valve seats having different combinations of thread size and diameter with only slight variations between the dimensions of different units, these dimensions are not readily discernible by eye.

Heretofore it was necessary for the plumber to use separate gauges to measure the diameter and thread size and thereafter try to locate a replacement valve seat having the required dimensions. This was often a time-consuming job as the gauging means were separate from the containers for the replacement parts so that it was necessary to first locate the gauging means, take the measurements of the worn part, correlate the measurements, and thereafter locate the appropriate replacement part.

The instant invention considerably simplifies this procedure by providing a case containing a plurality of containers, each having a different size fitting therein with each container being marked with an appropriate identification symbol to indicate the fitting therein. The upper edges of the case sides are stepped with the top of each step being notched to form a thread gauge. Naturally, the notches of each step differ from the notches of all the other steps. Further, the openable cover of the case is provided with a depending front edge having a series of gauging apertures therein to determine the diameter of the fitting.

Once the thread size and diameter of the worn fitting are determined, these dimensions are translated into a replacement fitting identification number by reference to a conversion chart cover on the inside of the case. The replacement identification number identifies the particular one of the case containers having the appropriate replacement part.

Accordingly, a primary object of the instant invention is to provide a novel kit means for replacement parts.

Another object of the instant invention is to provide a kit means of this type wherein the case includes a novel arrangement of gauging means.

Still another object of the instant invention is to provide a kit means of this type including a casing whose sides are provided with thread gauge means and whose cover front edge includes a diameter gauge means.

A further object of the instant invention is to provide a kit means of this type which also includes a plurality of containers within the case with each container having appropriate indicia to identify the replacement part therein, and with this indicia being correlated to thread size and diameter by means of a chart carried by the cover of the case.

These as well as other objects of the instant invention shall become readily apparent after reading the following description of the accompanying drawings, in which:

FIGURE 1 is a perspective of a kit means constructed in accordance with the teachings of the instant invention.

FIGURE 2 is a front elevation of the kit means of FIGURE 1.

FIGURE 3 is a side elevation of the kit means of FIGURE 1.

Now referring to the figures. Kit means 10 comprises a case formed of pan-like base 11 and openable cover 12. Hinge means 13' at the back edge of cover 12 pivotally secures cover 12 to base 11. Clip 13, pivotally mounted to the front wall of base 11, is adapted to engage clip 14, projecting from the cover depending front edge 15, to maintain cover 12 in the closed position of FIGURE 2.

Disposed within base 11 are a plurality of removable containers 16 having replacement parts therein. The identities of the replacement parts within the respective containers 16 are designated by appropriate indicia marked upon the upper surfaces of containers 16 as these containers are oriented in FIGURE 1. Interior side ledges 17, 18 maintain the end containers 16 spaced from the side walls 21, 22 of case 11 for a reason which shall become apparent.

As best seen in FIGURE 1, the upper edges of base side walls 21, 22 are stepped. The top of each step is notched to constitute a thread gauge. Appropriate indicia appear on the outside surfaces of walls 21, 22 to indicate the number of threads for each group of gauge notches. With cover 12 closed its depending side edges overlap substantial portions of the thread gauge portions of walls 21, 22 to prevent damage to these portions.

The depending front edge 15 of cover 12 is provided with a plurality of circular apertures graduated in size to constitute a gauge for measuring diameter. Appropriate indicia are marked on the outside of cover edge 15 to indicate the diameter of the respective apertures.

Conversion chart 30 mounted to the inside of cover 12 provides a means for readily correlating the thread size and diameter size readings to obtain the identification number of the appropriate replacement part. This identification number corresponds to the indicia on the outside of the container 16 containing the appropriate replacement part.

Kit means 10 is utilized in the following manner. First, the diameter of the threaded portion of the fitting to be replaced is determined by utilizing the apertures in cover edge 15 and thread size is determined by utilizing the thread gauge means at the side walls 21, 22 of base 11. The combined diameter and thread size, when located on conversion chart 30, identifies the number of one or more suitable replacement parts. The container 16 marked with the number of the desired replacement part is then located and the replacement part removed from this container 16 and installed. While the device of this invention has been described as having a plurality of receptacles in the form of removable containers 16 those skilled in the art will recognize that these receptacles may take the form of bins formed within the base.

Thus, this invention provides a novel replacement part kit means which includes a novel arrangement for gauging means and for converting the gauging means information into information whereby the appropriate replacement part is readily located in one of a plurality of containers.

Although there has been described a preferred embodiment of this novel invention, many variations and modifications will now be apparent to those skilled in the art. Therefore, this invention is to be limited, not by the specific disclosure herein, but only by the appended claims.

The embodiment of the invention in which an exclusive privilege or property is claimed is defined as follows:

1. A device of the class described comprising a case including an openable cover, a plurality of receptacles disposed within said case, and gauge means formed integrally with said case; said gauge means comprising a first portion and a second portion, said first portion constructed for determining a first parameter and said second portion constructed for determining a second parameter differing in character from said first parameter; said device further comprising a means carried by said case for converting determinations of said first and said second parameters into information referable to a particular one of said receptacles; said first portion constituting a diameter gauge and said second portion constituting a thread gauge; said openable cover including a depending edge, said diameter gauge comprising a series of graduated apertures in said edge.

2. A device of the class described comprising a case including an openable cover, a plurality of receptacles disposed within said case, and gauge means formed integrally with said case; said gauge means comprising a first portion and a second portion, said first portion constructed for determining a first parameter and said second portion constructed for determining a second parameter differing in character from said first parameter; said device further comprising a means carried by said case for converting determinations of said first and said second parameters into information referable to a particular one of said receptacles; said first portion constituting a diameter gauge and said second portion constituting a thread gauge; said case also including a pan-like base having side walls with steps along their upper edges, said thread gauge comprising notches in said steps with the notches in each of said steps differing from the notches in the remainder of said steps.

3. The device of claim 2 in which the cover is hinged along its rear edge to said base, said cover including a depending front edge, said diameter gauge comprising a series of graduated apertures in said front edge.

4. The device of claim 3 in which the base is provided with means positioning said receptacles a sufficient distance from said side walls to permit utilization of said thread gauge without the necessity of removing any of said receptacles from said case.

5. The device of claim 4 in which the cover also includes depending side edges which overlap substantial portions of said steps when said cover is closed thereby protecting said thread gauge from accidental damage.

References Cited in the file of this patent
UNITED STATES PATENTS

| | | |
|---|---|---|
| 318,051 | Starrett | May 19, 1885 |
| 987,703 | Curtin | Mar. 28, 1911 |
| 1,974,234 | Byrnes et al. | Sept. 18, 1934 |
| 2,008,429 | Weatherhead | July 16, 1935 |